(12) United States Patent
Lee et al.

(10) Patent No.: US 11,360,837 B2
(45) Date of Patent: Jun. 14, 2022

(54) HANDLING OPERATION SYSTEM (OS) IN SYSTEM FOR PREDICTING AND MANAGING FAULTY MEMORIES BASED ON PAGE FAULTS

(71) Applicant: Samsung Electronics Co., Ltd., Suwon-si (KR)

(72) Inventors: Jongyoung Lee, Seoul (KR); Dongyoon Kim, Hwaseong-si (KR); Minhyouk Kim, Hwaseong-si (KR); Jihyuk Oh, Suwon-si (KR); Insu Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/198,979

(22) Filed: Mar. 11, 2021

(65) Prior Publication Data
US 2021/0357279 A1 Nov. 18, 2021

(30) Foreign Application Priority Data
May 15, 2020 (KR) ........................ 10-2020-0058448

(51) Int. Cl.
*G06F 11/00* (2006.01)
*G06F 11/07* (2006.01)
*G06F 11/10* (2006.01)
*G06F 12/1036* (2016.01)
*G06F 9/455* (2018.01)

(52) U.S. Cl.
CPC ........ *G06F 11/073* (2013.01); *G06F 9/45558* (2013.01); *G06F 11/0772* (2013.01); *G06F 11/1016* (2013.01); *G06F 12/1036* (2013.01); *G06F 2009/45583* (2013.01)

(58) Field of Classification Search
CPC ............... G06F 11/073; G06F 11/1016; G06F 11/0772; G06F 12/1036; G06F 9/45558; G06F 2009/45583
USPC ...................................................... 714/1–57
See application file for complete search history.

(56) References Cited

U.S. PATENT DOCUMENTS

| | | | |
|---|---|---|---|
| 6,199,177 B1 * | 3/2001 | Blodgett | G11C 29/808 714/6.32 |
| 6,564,346 B1 * | 5/2003 | Vollrath | G11C 29/56 714/723 |
| 7,111,145 B1 * | 9/2006 | Chen | G06F 12/1036 711/6 |
| 7,337,291 B2 | 2/2008 | Abadi et al. | |

(Continued)

*Primary Examiner* — Sarai E Butler
(74) *Attorney, Agent, or Firm* — Muir Patent Law, PLLC

(57) ABSTRACT

A method of operating a system running a virtual machine that executes an application and an operating system (OS) includes performing first address translation from first virtual addresses to first physical addresses, identifying faulty physical addresses among the first physical addresses, each faulty physical address corresponding to a corresponding first physical address associated with a faulty memory cell, analyzing a row address and a column address of each faulty physical address and specifying a fault type of the faulty physical addresses based on the analyzing of the row address and the column address of each faulty physical address, and performing second address translation from second virtual addresses to second physical addresses based on a faulty address, thereby excluding the faulty address from the second physical addresses.

20 Claims, 13 Drawing Sheets

(56) References Cited

U.S. PATENT DOCUMENTS

| | | | |
|---|---|---|---|
| 7,653,840 B1* | 1/2010 | Taylor | G06F 11/0727 |
| | | | 714/47.2 |
| 8,711,625 B2 | 4/2014 | Li et al. | |
| 8,769,356 B2 | 7/2014 | Yu et al. | |
| 9,030,899 B2 | 5/2015 | Lee | |
| 9,424,123 B2 | 8/2016 | Leischner et al. | |
| 9,542,123 B2 | 1/2017 | Mozak et al. | |
| 9,652,321 B2 | 5/2017 | Motwani et al. | |
| 10,379,758 B2* | 8/2019 | Cheng | G06F 3/0679 |
| 10,403,390 B1 | 9/2019 | Wilson et al. | |
| 10,705,763 B2* | 7/2020 | Avraham | G06F 3/061 |
| 2002/0019961 A1* | 2/2002 | Blodgett | G11C 29/808 |
| | | | 714/718 |
| 2005/0240819 A1* | 10/2005 | Bennett | G06F 9/45558 |
| | | | 714/E11.21 |
| 2009/0049333 A1* | 2/2009 | Tseng | G11C 29/16 |
| | | | 714/5.1 |
| 2009/0144579 A1* | 6/2009 | Swanson | G06F 11/0712 |
| | | | 718/1 |
| 2012/0036405 A1* | 2/2012 | Iizuka | G11C 29/56008 |
| | | | 714/723 |
| 2014/0089725 A1* | 3/2014 | Ackaret | G11B 20/1883 |
| | | | 711/171 |
| 2014/0258780 A1* | 9/2014 | Eyres | G11C 29/16 |
| | | | 714/30 |
| 2014/0281694 A1* | 9/2014 | Gotsubo | G06F 11/0775 |
| | | | 714/6.32 |
| 2016/0124740 A1* | 5/2016 | Choi | G06F 8/65 |
| | | | 717/168 |
| 2016/0147667 A1* | 5/2016 | Awasthi | G06F 12/1491 |
| | | | 711/163 |
| 2017/0344489 A1* | 11/2017 | Kapoor | G06F 12/1027 |
| 2018/0067866 A1* | 3/2018 | Shanbhogue | G06F 11/0712 |
| 2018/0247699 A1 | 8/2018 | Pope et al. | |

* cited by examiner

HANDLING OPERATION SYSTEM (OS) IN SYSTEM FOR PREDICTING AND MANAGING FAULTY MEMORIES BASED ON PAGE FAULTS

CROSS-REFERENCE TO RELATED APPLICATION

This application claims the benefit of Korean Patent Application No. 10-2020-0058448, filed on May 15, 2020, in the Korean Intellectual Property Office, the disclosure of which is incorporated by reference herein in its entirety.

BACKGROUND

The inventive concept relates to a data processing system, and more particularly, to a system for predicting a faulty memory based on a page fault and managing the predicted faulty memory and a method of handling an operating system (OS) of the system.

A data processing system like a data center is hosted by many companies and their computer systems. The data center is used to distribute hosted applications and/or transactions and includes networked computer resources that are often referred to as clouds, e.g., servers, disks, virtual machines, etc. In this configuration, companies are clients of the data center. Data centers offer clients a number of advantages, including reduced cost, easy expansion, and reduced management load.

Demands for high-capacity memories for data centers for stable and fast real-time processing of large amounts of data have increased. However, the performance quality of a memory may change over time. For example, when an application and/or a transaction is allocated and uses a memory, a page fault may occur due to a fault in the memory. When such a page fault occurs frequently, the normal flow execution of instructions may be disrupted, and thus availability constraints of a data center, e.g., aborting and restarting a started operation, may occur. The page fault may arise from a single bit failure or two or more bits failures. Therefore, when a faulty memory may be identified based on a page fault, it will be possible to predict a memory fault due to the faulty memories. Also, managing a predicted memory fault in advance will be desirable for maintaining the availability of a data center.

SUMMARY

The inventive concept provides a system for predicting a memory fault based on a page fault and managing the predicted memory fault and a method of handling an operating system of the system.

According to an exemplary embodiment of the present invention, a method of operating a system running a virtual machine that executes an application and an operating system (OS) includes performing, by the OS, first address translation from a plurality of first virtual addresses processed by the application to a plurality of first physical addresses for accessing a memory, identifying, by the OS, a plurality of faulty physical addresses among the plurality of first physical addresses, wherein each of the plurality of faulty physical addresses corresponds to a corresponding first physical address, among the plurality of first physical addresses, associated with a faulty memory cell of the memory, analyzing, by the OS, a row address and a column address of each of the plurality of faulty physical addresses and specifying, by the OS, a fault type of the plurality of faulty physical addresses based on the analyzing of the row address and the column address of each of the plurality of faulty physical addresses, wherein the fault type includes a row failure, a column failure or a block failure, and performing, by the OS, second address translation from a plurality of second virtual addresses to a plurality of second physical addresses based on a faulty address, thereby excluding the faulty address from the plurality of second physical addresses. The faulty address corresponds to the fault type of the plurality of faulty physical addresses, and includes a faulty row address of the row failure, a faulty column address of the column failure, or a faulty block address of the block failure.

According to an exemplary embodiment of the present invention, a non-transitory computer-readable recording medium storing computer-executable instructions for performing a method of operating a system running a virtual machine that executes an application and an operating system (OS) includes executing the application using a processor and a memory of the system, performing first address translation from a plurality of first virtual addresses allocated to the application to a plurality of first physical addresses for accessing the memory, identifying, during a time when the application is executed, a plurality of faulty physical addresses among the plurality of first physical addresses translated from the plurality of first virtual addresses, specifying a fault type of the plurality of faulty physical addresses, wherein the fault type includes a row failure, a column failure, or a block failure, and performing second address translation from a plurality of second virtual addresses to a plurality of second physical addresses based on a faulty address, thereby excluding the faulty address from the plurality of second physical addresses. The faulty address corresponds to the fault type of the plurality of faulty physical addresses, and includes a faulty row address of the row failure, a faulty column address of the column failure or a faulty block address of the block failure.

According to an exemplary embodiment of the present invention, a system operating in a virtual machine environment includes a memory, and a processor operatively coupled to the memory. The processor executes an application in cooperation with the memory, performs first address translation from a plurality of first virtual addresses processed by the application to a plurality of first physical addresses for accessing the memory, identifies a plurality of faulty physical addresses among the plurality of first physical addresses, wherein each of the plurality of faulty physical addresses corresponds to a corresponding first physical address, among the plurality of first physical addresses, associated with a faulty memory cell of the memory, specifies a fault type of the plurality of faulty physical addresses of the memory, wherein the fault type includes a row failure, a column failure, or a block failure, and performs second address translation from a plurality of second virtual addresses to a plurality of second physical addresses based on a faulty address to prevent the faulty address from being used for the second address translation. The faulty address corresponds to the fault type of the plurality of faulty physical addresses, and includes a faulty row address of the row failure, a faulty column address of the column failure or a faulty block address of the block failure. The processor is further configured to, without causing the system to be rebooted, specify the fault type, store the faulty address, and perform the second address translation.

According to an exemplary embodiment of the present invention, a memory device includes a memory cell array comprising a plurality of memory cells, and a repair control circuit configured to repair a plurality of faulty memory cells from among the plurality of memory cells by using a plurality of redundancy memory cells in the memory cell array. The repair control circuit is configured to receive, during rebooting of the memory device, a source address of the plurality of faulty memory cells from a processor to which the memory device is operatively coupled and repair the source address with a destination address of the plurality of redundancy memory cells. The source address of the plurality of faulty memory cells corresponds to a faulty address including a common row address of the plurality of faulty memory cells, a common column address of the plurality of faulty memory cells, or a block address of the plurality of faulty memory cells. The plurality of faulty memory cells are identified during execution of a virtual machine running on the processor. The faulty address of the plurality of faulty memory cells is included in a plurality of physical addresses for accessing the memory device by a system. The plurality of physical addresses are translated from a plurality of virtual addresses used by the processor.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
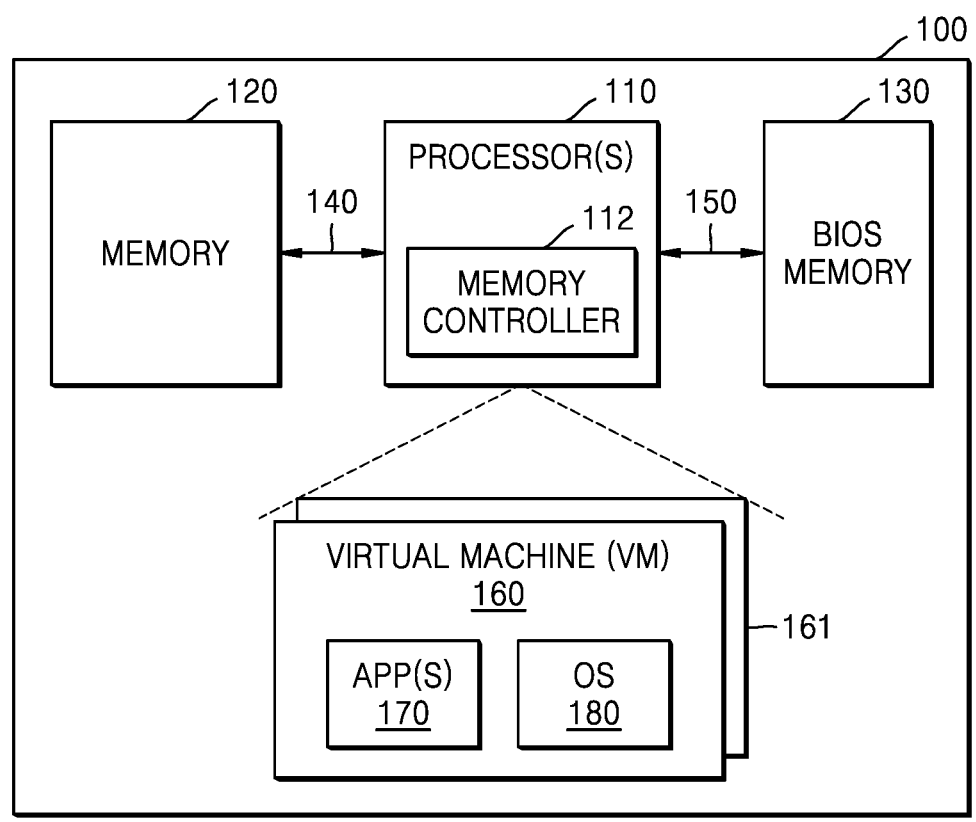
FIG. 1 is a block diagram conceptually showing a system according to embodiments of the inventive concept.

FIG. 1 is a block diagram conceptually illustrating an example system that may be used to predict failed memories based on page faults and manage predicted failed memories according to embodiments of the inventive concept.

Referring to FIG. 1, a system 100 may be a data center including dozens of host machines or servers for performing hundreds of virtual machines VM. Although various hardware components of the system 100 to be described below are shown in FIG. 1, the inventive concept is not limited thereto, and other components may be employed. The system 100 may include a processor 110, a memory 120, and a basic input/output system (BIOS) memory 130.

The processor 110 may be communicatively connected to the memory 120 through a memory interface 140. The processor 110 may be connected to the BIOS memory 130 through an interface 150 of various types like a serial peripheral interface (SPI) or a low pin count (LPC) bus. The memory 120 and the BIOS memory 130 connected to the processor 110 may be referred to as system memories.

Some examples may be described by using the expressions "connected" and/or "coupled" together with their derivatives. These terms are not necessarily intended as synonyms for each other. For example, descriptions using the terms "connected" and/or "coupled" may indicate that two or more elements are in direct physical or electrical contact with each other. In addition, the terms "connected" and/or "coupled" may also mean that two or more elements are not in direct contact with each other but still cooperate or interact with each other.

According to some embodiments, the system 100 may be, for example, a computing device like a laptop computer, a desktop computer, a server computer, a workstation, a portable communication terminal, a personal digital assistant (PDA), a portable multimedia player (PMP), a smart phone, or any other suitable computers, a VM, or a virtual computing device thereof. Alternatively, the system 100 may be one of components included in a computing system, e.g., a graphics card.

The processor 110 is a functional block for performing general computer operations in the system 100 and may be a processor like a central processing unit (CPU), a digital signal processor (DSP), a network processor, an application processor (AP), or any other device for executing codes.

The processor 110 may be configured to execute instructions, software, firmware, or pieces of combinations thereof that may be executed by one or more machines. The processor 110 may include any number of processor cores. For example, the processor 110 may include a single-core or a multi-core like dual-core, quad-core, and hexa-core. Although FIG. 1 shows the system 100 including one processor 110, according to an embodiment, the system 100 may include two or more processors.

The processor 110 may execute software in a virtualized environment. Accordingly, a virtual machine VM in the system 100 may include an application APP and an operating system (OS). Since virtual machines VM may be dynamically changed during their use initiated and stopped by a user, the number of the virtual machine VM that may be executed on processor 110 may vary. Software entities such as an OS consider the processor 110 as a logic processor or a processing element capable of executing virtual machines VM simultaneously. For example, n (n is a natural number) OS may consider the processor 110 as n logic processors or n processing elements.

In the virtual machines VM, each application APP uses a virtual address space, and thus a virtual address VA (i.e., an address that may be used by software) is used. The OS in each virtual machine VM may control a time point at which a particular application APP accesses a given memory 120 and may control addresses that are accessed by the application APP to at least a certain degree. The OS in the virtual machine VM may perform and manage mapping between virtual addresses VA and physical addresses PA in the virtual machine VM. Physical addresses PA generated by the OS are system physical addresses PA (i.e., physical addresses that may be used by the memory controller 112 to access the memory 120) of a physical address space throughout the memory 120 of the system 100. The OS may perform address translation (e.g., address mapping) between virtual addresses VA and system physical addresses PA.

To briefly illustrate machine virtualization in the system 100, FIG. 1 shows two virtual machines 160 and 161. Each of the virtual machines 160 and 161 includes an OS and at least one application APP. According to some embodiments, a plurality of virtual machines VM may be executed, and the processor 110 may execute and implement a large number of applications APP and/or transactions in terms of time and memory footprints through combination of hardware acceleration and software. Hereinafter, for convenience of explanation, an application 170 and an OS 180 accessing the memory 120 will be described under an assumption that the system 100 runs a first virtual machine 160.

The BIOS memory 130 may store a BIOS code for booting the system 100. The BIOS memory 130 may be implemented by a non-volatile memory device. The non-volatile memory devices may be implemented by an electrically erasable programmable read-only memory (EEPROM), a flash memory, a resistive RAM (RRAM), a magnetic RAM (MRAM), a phase change RAM (PRAM), a ferroelectric RAM (FRAM), a nano floating gate memory (NFGM), a polymer RAM (PoRAM), or a similar memory.

The BIOS code may include a power-on-self-test (POST) code for detecting hardware components of the system 100 like a system board, the memory 120, a disc drive, and input/output (I/O) devices and checking whether the hardware components are normally working and/or a part of the POST code. The BIOS code may include various algorithms that are configured to allow the processor 110 to normally interoperate with the memory 120.

The memory interface 140 is shown as being connected through a single signal line between the processor 110 and the memory 120 for simplicity of illustration, but may be actually connected through a plurality of signal lines. The memory interface 140 includes connectors for connecting the memory controller 112 and the memory 120 to each other. In an example embodiment, the connectors may be implemented as pins, balls, signal lines, or other hardware components. For example, clocks, commands, addresses, data, etc. may be exchanged between the memory controller 112 and the memory 120 through the memory interface 140. The memory interface 140 may be implemented as one channel including a plurality of signal lines or may be implemented as a plurality of channels. Also, one or more memories 120 may be connected to a corresponding channel of the plurality of channels.

The processor 110 may include a memory controller 112 that controls data transmission/reception to/from the memory 120. The memory controller 112 may access the memory 120 according to a memory request of the processor 110, and a system physical address may be provided to access the memory 120. The memory controller 112 may include a memory physical layer interface, that is, a memory PHY for memory interfacing like selecting a row and a column corresponding to a memory cell, writing data to a memory cell, or reading written data. The memory controller 112 performing the functions stated above may be implemented in various forms. For example, memory controller 112 may be implemented by one or more hardware components (e.g., analog circuits, logic circuits) and program codes of software and/or firmware. The memory controller 112 may be integrated into the processor 110, such that the memory 120 may be accessed by the processor 110 at high speed and/or low power consumption.

Data used for the operation of the system 100 may be stored in or loaded from the memory 120. Data processed or to be processed by the processor 110 may be stored in or read from the memory 120. The memory 120 may include a volatile memory like a static random access memory (SRAM) and a dynamic random access memory (DRAM) and/or a non-volatile memory like a flash memory, an RRAM, an MRAM, a PRAM, and a FRAM.

The memory 120 may include memory cells for storing data. A memory cell may be accessed using an address. Write data may be written to a memory cell indicated by an address, and read data may be loaded from a memory cell indicated by an address. In the present disclosure, one memory region in the memory 120 may include a memory cell array with a plurality of memory cells which are accessed using a plurality of addresses.

When a memory cell in the memory region fails, the memory 120 may be configured to repair a faulty cell with a redundancy cell. The memory 120 is capable of performing post package repair (PPR) that repairs faulty cells additionally occurring due to continuous use with redundancy cells.

The processor 110 may provide addresses to the memory 120 to exchange data which are read from the memory 120 and stored in the memory 120 during execution of the application 170. The memory 120 may store or read data based on requests (e.g., commands and addresses) received from the processor 110.

Meanwhile, an address processed by the application 170 may be referred to as a virtual address VA, and an address for accessing the memory 120 may be referred to as a system physical address PA (i.e., a physical address). The OS 180 may perform address translation between a virtual address VA processed by an application APP and a system physical address PA for the memory 120. In an example embodiment, the application 170 processed by the processor 110 may operate with reference to the virtual addresses VA, and when accessing the memory, may use the system physical addresses PA translated from the virtual addresses VA.

Figure 2:
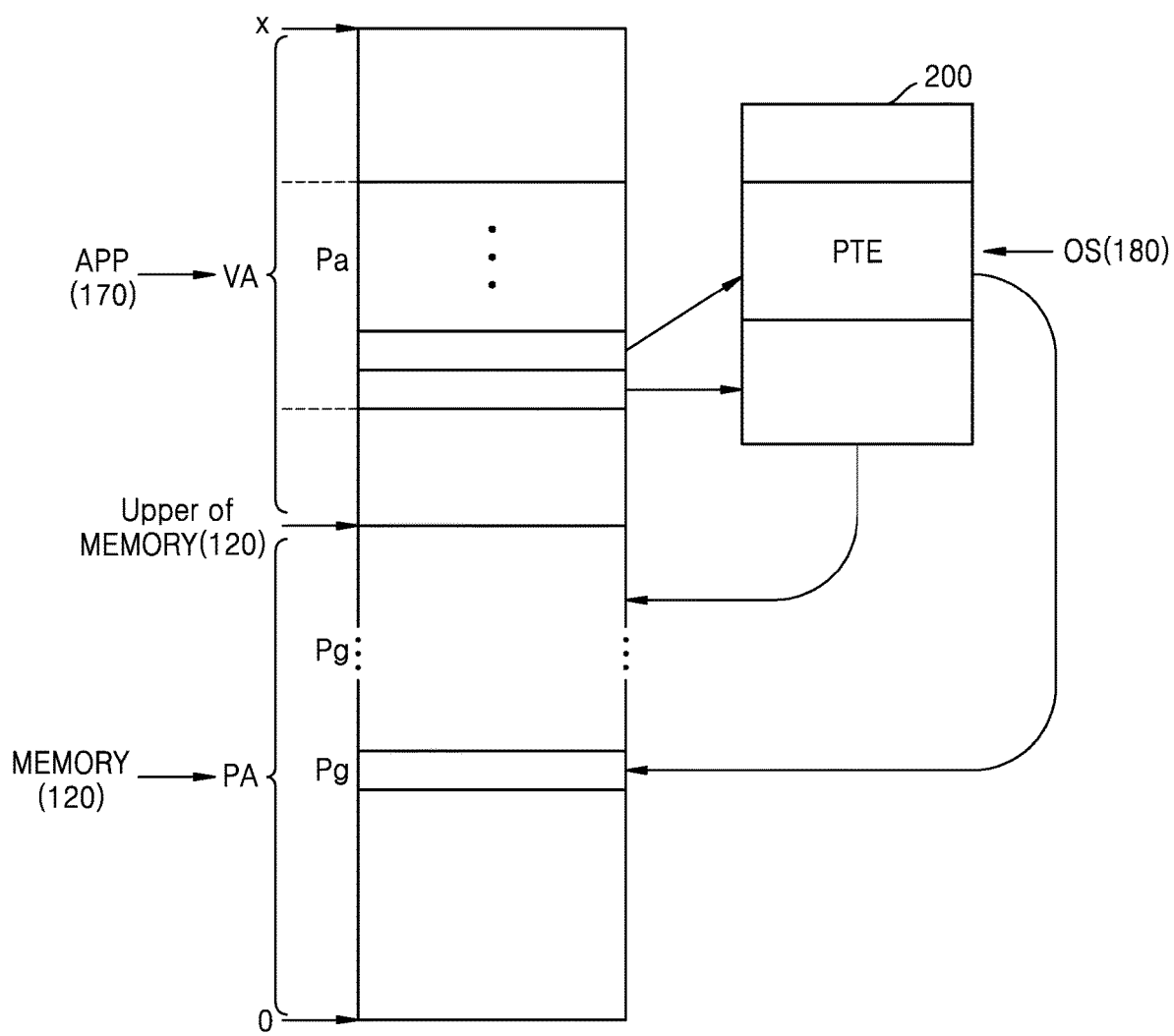
FIG. 2 is a diagram for describing an example of address mapping for address translation performed by a processor of FIG. 1.

FIG. 2 is a diagram for describing an example of address mapping for address translation performed by the processor 110 of FIG. 1.

Referring to FIGS. 1 and 2, the memory 120 has a system physical address PA range from an address zero (0) to an upper level. The application 170 may have a virtual address VA range starting from the upper level of the system physical address PA range of the memory 120. Each address Pa of virtual addresses VA may be mapped to an address Pg (or an address space) of system physical addresses PA of the memory 120. The OS 180 may allocate a page requested for memory access by the application 170 to a page of the memory 120. At this time, a reference designated from a virtual address Pa to a corresponding system physical address Pg may be stored in an address mapping table 200 as a page table entry PTE. A page may be a unit of address translation. In other words, addresses in a virtual page may be translated into addresses in a corresponding physical page. Pages may have various sizes ranging from 4 kilobytes up to Megabytes or even Gigabytes.

It is noted that locations and sizes of addresses shown in FIG. 2 are merely examples, and are not necessarily those of actual memory addressed. Also, the example memory shown in FIG. 2 does not represent or imply limitations on the inventive concept.

Figure 3:
FIG. 3 is a diagram showing an example of an address mapping table of FIG. 2.

FIG. 3 is a diagram showing an example of the address mapping table 200 of FIG. 2.

Referring to FIGS. 2 and 3, the OS 180 may manage the address mapping table 200. Page table entries PTE of the address mapping table 200 may include information about a mapping relationship between virtual addresses VA and system physical address PA. For example, the address mapping table 200 may be implemented in the form of a look-up table. The OS 180 may translate the virtual addresses VA into the system physical addresses PA by referring to the page table entries PTE of the address mapping table 200.

For example, a virtual address Va1 may correspond to a system physical address Pa1. When the OS 180 receives the virtual address Va1 from the application 170, the OS 180 may map the virtual address Va1 to the system physical address Pa1. The OS 180 may process a request received from the application 170 together with the virtual address Va1 in association with a memory cell indicated by the system physical address Pa1.

Similarly, according to corresponding information in the address mapping table 200, the OS 180 may map virtual addresses Va2 and Va3 to system physical addresses Pa2 and Pa3, map virtual addresses Vb1, Vb2, and Vb3 to system physical addresses Pb1, Pb2, Pb3, and map virtual addresses Vc1, Vc2, Vc3, Vc4, and Vc5 to system physical addresses Pc1, Pc2, Pc3, Pc4, and Pc5. The OS 180 may process a request from the application 170 in association with memory cells indicated by system physical addresses Pa2, Pa3, Pb1, Pb2, Pb3, Pc1, Pc2, Pc3, Pc4, and Pc5 corresponding to virtual addresses Va2, Va3, Vb1, Vb2, Vb3, Vc1, Vc2, and Vc3.

Figure 4:
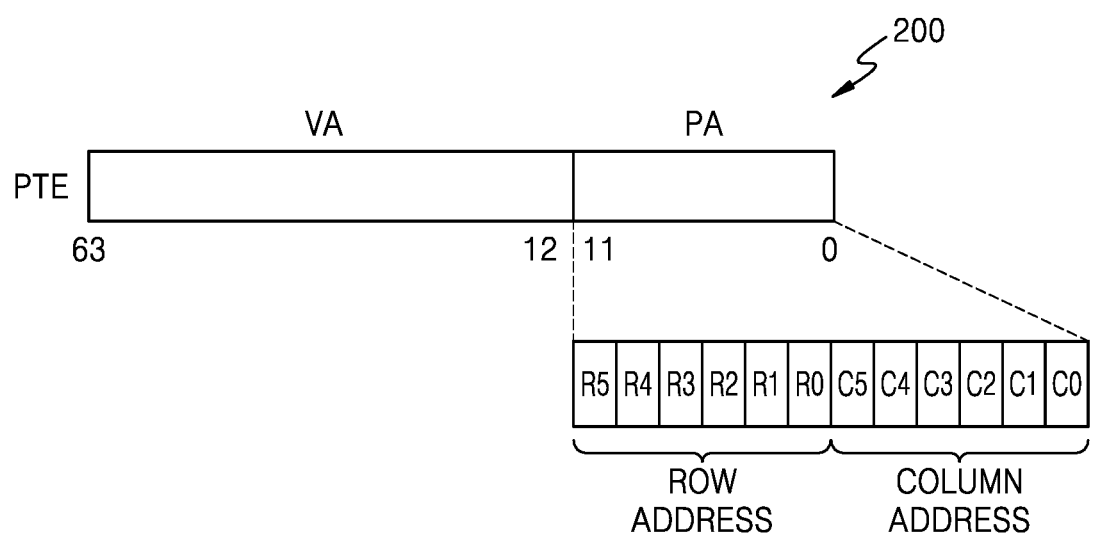
FIG. 4 is a diagram for describing an example of page table entries of the address mapping table of FIG. 3.

FIG. 4 is a diagram for describing an example of the page table entries PTE of the address mapping table 200 of FIG. 3.

Referring to FIG. 4, the page table entries PTE of the address mapping table 200 may be a table of translation data that may be used to translate a virtual address VA to a system physical address PA. The translation table may store translation data in any way. For example, depending on a translation level, various subsets of virtual address VA bits or system physical addresses PA may be used to index the levels of the translation table. Also, each level may be at the end of a translation (i.e., storing an actual page number for translation) or may point another table (indexed by another set of address bits) in a hierarchical manner.

The page table entries PTE may include pointers to other page tables in a hierarchical manner. The page table entry PTE may indicate a level in a page table layer structure, e.g., page map levels 2, 3, or 4, at which translation needs to be started for requests mapped to the corresponding page table entry PTE. Therefore, the page table entries PTE of a table of a page map level 2, 3, or 4 may include any number of bit entries.

The page table entries PTE shown in FIG. 4 are a first level translation table. In the first level translation table, fields related to address translation are provided to map a virtual address to a system physical address. However, the present invention is not limited thereto. In an example embodiment, the present invention may apply to a second level address translation table where a single bit field and/or a plurality of bit fields may be provided for translation level identification, depths of tables, indication of translation invalid/valid, etc. Further action may occur with reference to the bit field or bit fields to complete address translation. In the present embodiment, the page table entry PTE relates to a translation of virtual page address bits into actual system physical page address bits and is a 64-bit entry, for example.

The page table entry PTE may include a virtual address VA field and a system physical address PA field. The virtual address VA field is configured to increase a virtual address space to be used by the application 170, and the system physical address PA field indicates an address of the memory 120 corresponding to the virtual address VA. For example, the system physical address PA field may include PTE[11:0] bits, and the virtual address VA field may include PTE[63:12] bits. The system physical address PA field may include row address R[5:0] bits and column address C[5:0] bits.

Figure 5:
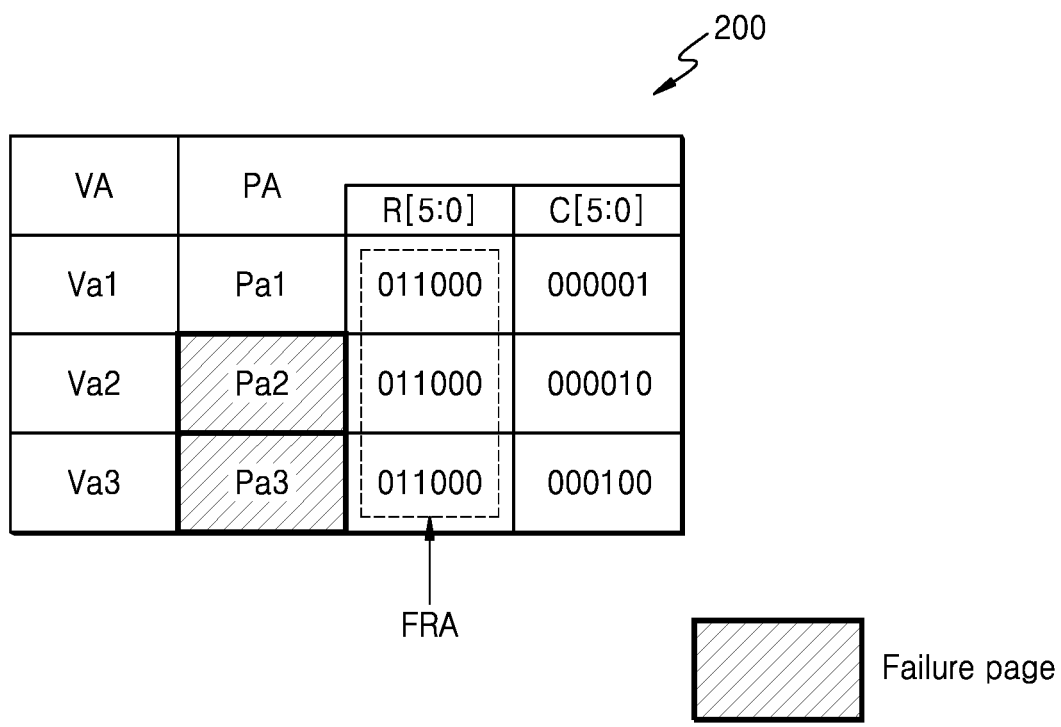
FIG. 5 is a diagram for describing the row-based fault attribute shown in the address mapping table of FIG. 3.

FIG. 5 is a diagram for describing a row-based fault attribute shown in the address mapping table of FIG. 3.

Referring to FIG. 5, according to virtual addresses Va1, Va2, and Va3 at which the application 170 is being executed on the processor 110, the OS 180 may provide system physical addresses Pa1, Pa2, and Pa3 corresponding to the virtual addresses Va1, Va2, and Va3 for accessing the memory 120. For example, a system physical address Pa1 corresponding to a virtual address Va1 may be provided as a row address R[5:0] bits of 011000 and a column address C[5:0] bits of 000001. The processor 110 may execute the application 170 by accessing a memory cell indicated by the row address R[5:0] bits of 011000 and the column address C[5:0] bits of 000001 of the system physical address Pa1 through the memory controller 112.

Similarly, a system physical address Pa2 corresponding to a virtual address Va2 may be provided as a row address R[5:0] bits of 011000 and a column address C[5:0] bits of 000010, and a system physical address Pa3 corresponding to a virtual address Va3 may be provided as a row address R[5:0] bits of 011000 and a column address C[5:0] bits of 000100. The processor 110 may execute the application 170 by accessing a memory cell indicated by the row address R[5:0] bits of 011000 and the column address C[5:0] bits of 000010 of the system physical address Pa2 and a memory cell indicated by the row address R[5:0] bits of 011000 and the column address C[5:0] bits of 000100 of the system physical address Pa3 through the memory controller 112.

However, execution associated with the system physical address Pa2 of the memory 120 does not operate properly. Also, execution associated with the system physical address Pa3 of the memory 120 does not operate properly. In other words, a page fault may occur. From among a plurality of execution paths for the applications 170, an error may occur in an execution path regarding the memory 120, for example. In detail, memory errors may occur at system physical addresses Pa2 and Pa3. One of the major causes of such memory errors is when memory cells addressed by the system physical addresses Pa2 and Pa3 fail, that is, when a hardware exception event is detected.

Generally, when such exception events frequently occur, the system 100, which is pending, may be stopped and attempts for resuming the system 100 (i.e., rebooting of the system 100) may be made. Such a solution is unable to achieve acceleration of the system 100. The OS 180 may perform controls to process exception events without stopping the system 100. The OS 180 may continue operating the system 100 by combining hardware support from the processor 110 with OS codes. As described in more detail below, the mechanism of the OS 180 for this function may be provided.

The OS 180 may become aware of (i.e., identify) faulty pages (i.e., faulty physical addresses) of the system physical addresses Pa2 and Pa3. In an example embodiment, the faulty addresses may refer to physical addresses associated with faulty memory cells. The OS 180 may observe (i.e., analyze) bits of the row address R[5:0] and bits of the column address C[5:0] identified at the system physical addresses Pa2 and Pa3, thereby determining that the system physical addresses Pa2 and Pa3 have the same row address R[5:0] bits of 011000. Since memory cells addressed by the system physical addresses Pa2 and Pa3 have the same row address (i.e., the common row address), the OS 180 may expect that there is a high possibility that the memory cells accessed with the row address are faulty. Therefore, the OS 180 may predict or consider a fault type of memory cells accessed with the row address R[5:0] bits of 011000 in the memory region of the memory 120 as possible row-based fault. Hereinafter, the row address R[5:0] bits of 011000 may be referred to as a faulty row address FRA of the fault type.

Although memory cells accessed with the row address R[5:0] bits of 011000 of the system physical address Pa1 of the memory 120 are not fail, the OS 180 may be given a privilege to specify memory cells accessed with the row address R[5:0] bits of 011000 as row-based fault. When the OS 180 translates a system physical address PA corresponding to a virtual address VA at which the application 170 is being executed on the processor 110, the OS 180 does not provide a faulty row address FRA as the system physical address PA, such that row-based faulty memory cells are not selected. Also, the OS 180 may store the faulty row address FRA in the BIOS memory 130 (FIG. 1).

Figure 6:
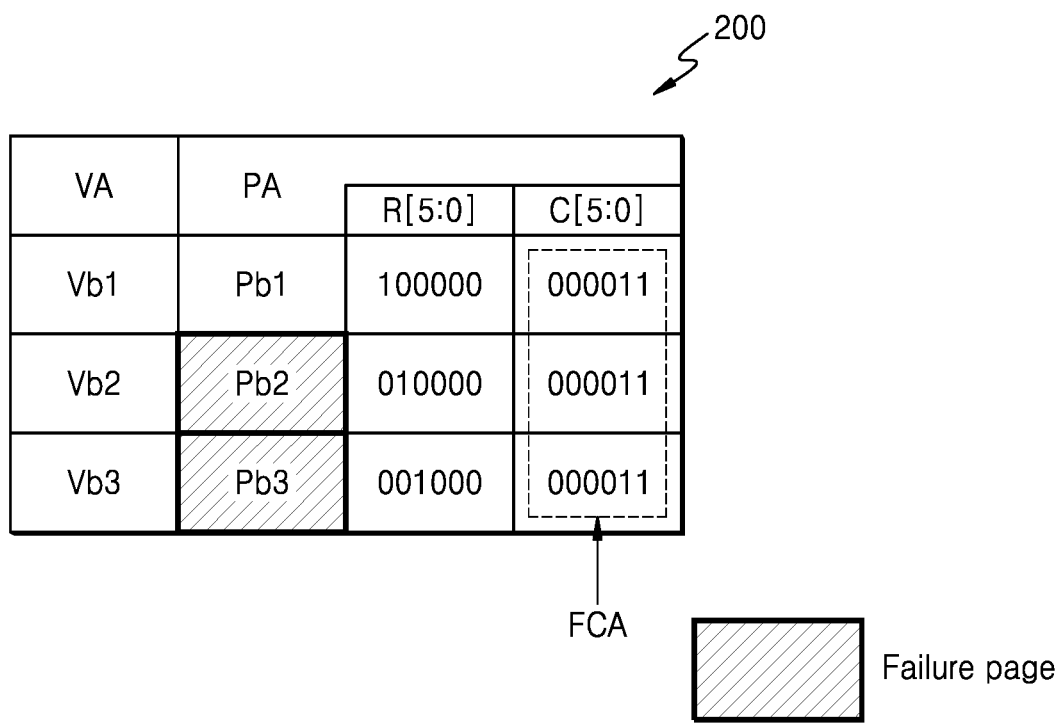
FIG. 6 is a diagram for describing the column-based fault attribute shown in the address mapping table of FIG. 3.

FIG. 6 is a diagram for describing a column-based fault attribute shown in the address mapping table of FIG. 3.

Referring to FIG. 6, according to virtual addresses Vb1, Vb2, and Vb3 at which the application 170 is being executed on the processor 110, the OS 180 may provide system physical addresses Pb1, Pb2, and Pb3 corresponding to the virtual addresses Vb1, Vb2, and Vb3 for accessing the memory 120. For example, a system physical address Pb1 corresponding to a virtual address Vb1 may be provided as a row address R[5:0] bits 100000 and a column address C[5:0] bits of 000011. The processor 110 may execute the application 170 by accessing a memory cell indicated by the row address R[5:0] bits 100000 and the column address C[5:0] bits of 000011 of the system physical address Pb1 through the memory controller 112.

Similarly, a system physical address Pb2 corresponding to a virtual address Vb2 may be provided as a row address R[5:0] bits of 010000 and a column address C[5:0] bits of 000011, and a system physical address Pb3 corresponding to a virtual address Vb3 may be provided as a row address R[5:0] bits of 001000 and a column address C[5:0] bits of 000011. The processor 110 may execute the application 170 by accessing a memory cell indicated by the row address R[5:0] bits of 010000 and the column address C[5:0] bits of 000011 of the system physical address Pb2 and a memory cell indicated by the row address R[5:0] bits of 001000 and the column address C[5:0] bits of 000011 of the system physical address Pb3 through the memory controller 112.

However, execution associated with the system physical address Pb2 and execution associated with the system physical address Pb3 of the memory 120 does not operate properly. During the execution of the application 170, memory errors may occur at system physical addresses Pb2 and Pb3. The OS 180 may become aware of faulty pages of the system physical addresses Pb2 and Pb3. The OS 180 may observe bits of the row address R[5:0] and bits of the column address C[5:0] identified at the system physical addresses Pb2 and Pb3. The OS 180 may determine that the system physical addresses Pb2 and Pb3 have the same column address C[5:0] bits of 000011. Since memory cells addressed by the system physical addresses Pb2 and Pb3 have the same column address, the OS 180 may expect that there is a high possibility that the memory cells accessed with the column address are faulty. Therefore, the OS 180 may predict or consider a fault type of memory cells accessed with the column address C[5:0] bits of 000011 in the memory region of the memory 120 as possible column-based fault. Hereinafter, the column address C[5:0] bits of 000011 may be referred to as a faulty column address FRA of the fault type.

Although memory cells accessed with the column address C[5:0] bits of 000011 of the system physical address Pb1 of the memory 120 are not fail, the OS 180 may specify memory cells accessed with the column address C[5:0] bits of 000011 as column-based fault. When the OS 180 translates a system physical address PA corresponding to a virtual address VA at which the application 170 is being executed on the processor 110, the OS 180 does not provide a faulty column address FCA as the system physical address PA, such that column-based faulty memory cells are not selected. Also, the OS 180 may store the faulty column address FCA in the BIOS memory 130 of FIG. 1.

As shown in FIGS. 5 and 6, the OS 180 may specify the two faulty pages as have been described above as a row-based fault or a column-based fault. The present invention is not limited thereto. In an example embodiment, the OS 180 may specify three or more faulty pages as a row-based fault or a column-based fault when the number of the faulty pages exceeds a reference value. In this embodiment, the reference value may be set to n (n is a natural number equal to or greater than 2). According to other embodiments, the reference value may be set differently and may also be changed.

Figure 7:
FIG. 7 is a diagram for describing the block-based fault attribute shown in the address mapping table of FIG. 3.

FIG. 7 is a diagram for describing a block-based fault attribute shown in the address mapping table of FIG. 3.

Referring to FIG. 7, according to virtual addresses Vc1, Vc2, Vc3, Vc4, and Vc5 at which the application 170 is being executed on the processor 110, the OS 180 may provide system physical addresses Pc1, Pc2, Pc3, Pc4, and Pc5 corresponding to the virtual addresses Vc1, Vc2, Vc3, Vc4, and Vc5 for accessing the memory 120. For example, a system physical address Pc1 corresponding to a virtual address Vc1 may be provided as a row address R[5:0] bits of 110001 and a column address C[5:0] bits of 111000. A system physical address Pc2 corresponding to a virtual address Vc2 may be provided as a row address R[5:0] bits of 110010 and a column address C[5:0] bits of 111010, a system physical address Pc3 corresponding to a virtual address Vc3 may be provided as a row address R[5:0] bits of 110100 and a column address C[5:0] bits of 110000, a system physical address Pc4 corresponding to a virtual address Vc4 may be provided as a row address R[5:0] bits of 111000 and a column address C[5:0] bits of 110010, and a system physical address Pc5 corresponding to a virtual address Vc5 may be provided as a row address R[5:0] bits of 111111 and a column address C[5:0] bits of 110100. The processor 110 may access the memory cells indicated by the system physical addresses Pc1, Pc2, Pc3, Pc4, and Pc5 through the memory controller 112, thereby executing the application 170.

However, execution associated with the system physical addresses Pc1, Pc2, Pc3, Pc4, and Pc5 of the memory 120 does not operate properly. During the execution of the application 170, memory errors may occur at the system physical addresses Pc1, Pc2, Pc3, Pc4, and Pc5. The OS 180 may become aware of faulty pages of the system physical addresses Pc1, Pc2, Pc3, Pc4, and Pc5. The OS 180 may observe bits of the row address R[5:0] and bits of the column address C[5:0] identified at the system physical addresses Pc1, Pc2, Pc3, Pc4, and Pc5. The OS 180 may determine that the two uppermost bits of the row addresses R[5:0] of the system physical addresses Pc1, Pc2, Pc3, Pc4, and Pc5 (i.e., bits R[5:4] 11) are the same and the two uppermost bits of the column addresses C[5:0] (i.e., bits C[5:4] 11) are the same.

Generally, to access a memory cell, the memory 120 may be configured to sequentially decodes row address bits by using a row decoder, generate a decoded row address signal, and activate a word line corresponding to a decoded row address signal. Here, decoded row address signal lines may be arranged in a row-wise direction from the bottom or the top of a memory region, wherein upper bits of a row address may serve as a signal for addressing a particular region on the upper side or the lower side based on the center of the memory region. Similarly, the memory 120 is configured to sequentially decode column address bits by using a column decoder, generate a decoded column address signal, and activate bit lines corresponding to a decoded column address signal. Here, decoded column address signal lines may be arranged in a column-wise direction from the left side or the right side of a memory region, wherein upper bits of a column address may serve as a signal for addressing a particular region on the left side or the right side based on the center of the memory region.

Since memory cells addressed by the system physical addresses Pc1, Pc2, Pc3, Pc4, and Pc5 have the same upper row address bits and the same upper column address bits, the OS 180 may expect that there is a high possibility that the memory cells accessed with the same upper row address bits and the same upper column address bits are faulty. Therefore, the OS 180 may predict or consider a fault type of memory cells accessed with the upper row address bits R[5:4] 11 and the upper column address bits C[5:4] 11 in the memory region of the memory 120 as possible block-based fault. Hereinafter, the upper row address bits R[5:4]11 and the upper column address bits C[5:4] 11 may be referred to as a faulty block address (FBA) of the fault type. The faulty row address, the faulty column address, the faulty block address may be referred to as a faulty address which may be stored in the BIOS and in the post package repair, may correspond to a source address to be replaced or repaired with a destination address of redundancy cells.

The OS 180 may specify memory cells accessed with the upper row address bits R[5:4]11 and the upper column address bits C[5:4] 11 as block-based fault. When the OS 180 translates a system physical address PA corresponding to a virtual address VA at which the application 170 is being executed on the processor 110, the OS 180 does not provide a faulty block address FBA as the system physical address PA, such that block-based fault memory cells are not selected. Also, the OS 180 may store the faulty block address FBA in the BIOS memory 130 (FIG. 1).

As shown in FIG. 7, a privilege that the OS 180 handles a block-based fault of the OS 180 by referring to five faulty pages has been described above, but such a privilege may be given when the number of faulty pages exceeds a reference value. In this embodiment, the reference value may be set to n (n is a natural number equal to or greater than 5). According to other embodiments, the reference value may be set differently and may also be changed.

Figure 8:
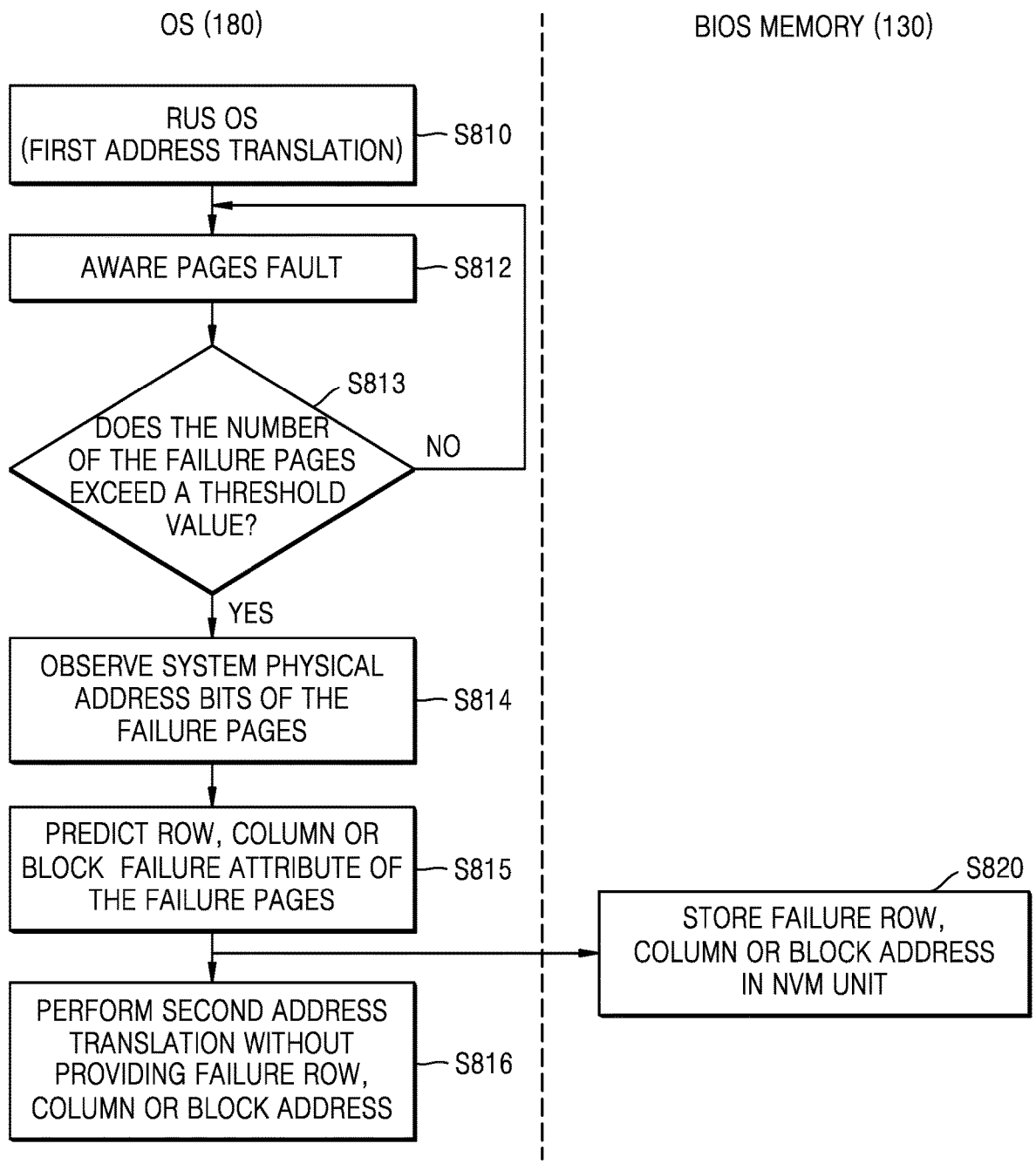
FIG. 8 is a flowchart of a method of handling a runtime OS of a system according to an embodiment of the inventive concept.

FIG. 8 is a flowchart of a method of handling a runtime OS of the system 100 according to an embodiment of the inventive concept.

Referring to FIGS. 1, 2, and 8, when the system 100 is operating, the OS 180 may be executed while providing machine virtualization to execute the application 170 in cooperation with the processor 110 (operation S810). The OS 180 in a virtual machine VM may perform first address translation between virtual addresses VA to be processed by the application 170 and system physical addresses PA for the memory 120. In an example embodiment, the processor 110 (i.e., the OS operated in the virtual machine VM executed by the processor 110) may execute the application 170 using the virtual addresses VA, and when accessing the memory 120, may use the system physical addresses PA translated from the virtual addresses VA. When at least one page fault occurs during the execution of the application 170, the OS 180 may become aware of (i.e., identify) faulty pages among the system physical addresses PA (operation S812).

The OS 180 may count the faulty pages and determine whether the number of the faulty pages exceeds a reference value (operation S813). When it is determined that the number of the faulty pages exceeds the reference value, the OS 180 may observe (i.e., analyze) bits of row addresses RA and bits of column addresses CA identified from the system physical addresses PA of the faulty pages (operation S814). When it is determined that the number of the faulty pages does not exceed the reference value, the OS 180 may continue to operate the application 170 and proceed to operation S812.

The OS 180 may predict a possible faulty address attribute appearing at the same bad address bits in the system physical addresses PA of the faulty pages (operation S815). The OS 180 may specify the possible faulty address attribute (i.e., a fault type) of the system physical addresses PA as a row-based fault, a column-based fault, or a block-based fault. Based on the specification of the possible faulty address attribute, when the OS 180 performs second address translation between virtual addresses and system physical addresses for the memory 120, the OS 180 does not provide faulty system physical addresses of a particular fault type (e.g., a row-based fault or a row failure, a column-based fault or a column failure, or a block-based fault or a block failure) (operation S816) as the system physical addresses. The present invention is not limited thereto. In an example embodiment, when another virtual machine executes an application in cooperation with the processor 110, an OS of another virtual machine may perform address translation based on the faulty system physical addresses to prevent the faulty system physical addresses from being used in the translation. In an example embodiment, the faulty system physical addresses may be stored as a faulty address in a local system memory of the processor 110, and may be referenced by at least one virtual machine or if previously stored in the BIOS memory 130, may be uploaded to the local system memory from the BIOS memory 130. Also, the OS 180 may store the faulty system physical addresses as a faulty address in the BIOS memory 130.

While the OS 180 is handling page faults, the operation of the system 100 is not interrupted or rebooted, and the method proceeds to operation S810. Therefore, the availability of the system 100 may be maintained.

Figure 9:
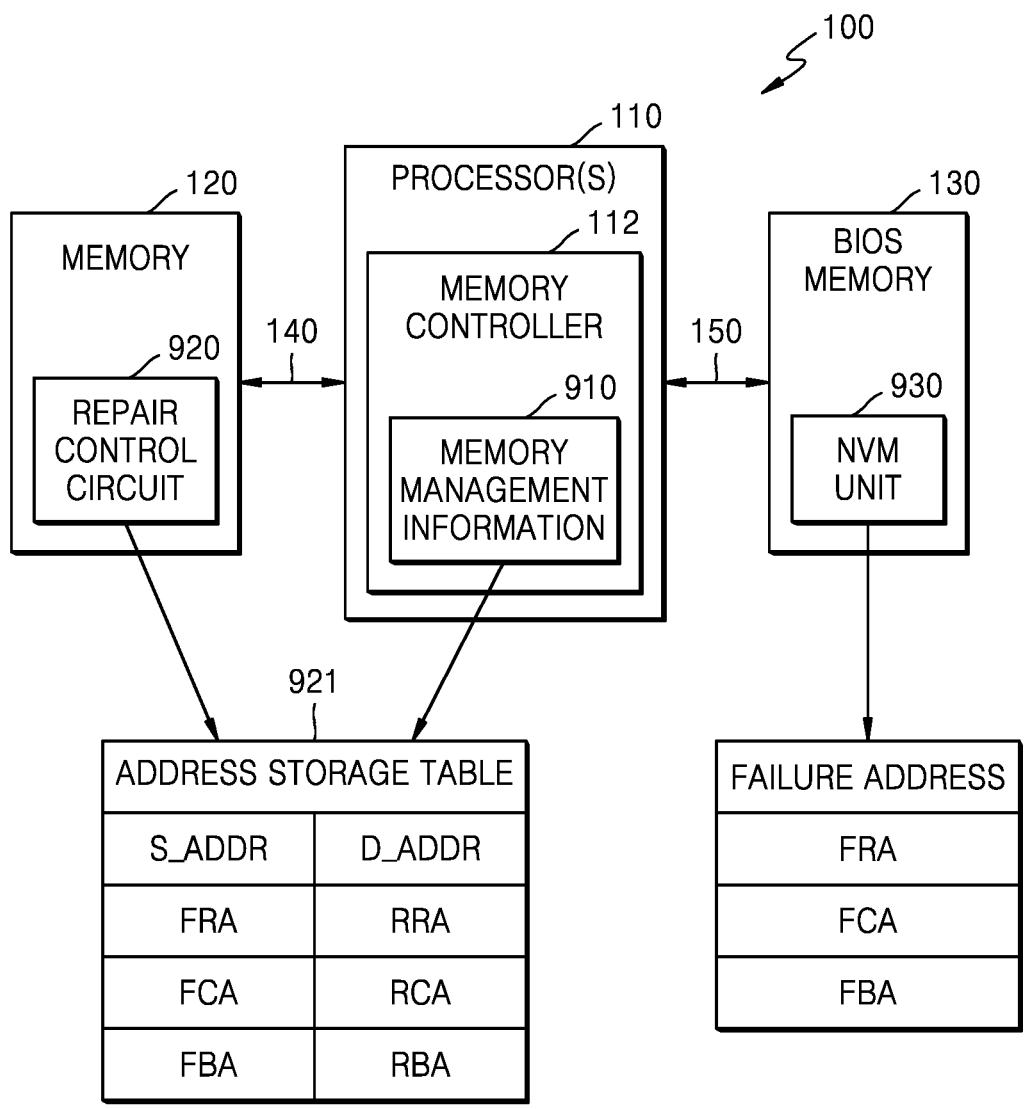
FIG. 9 is a conceptual diagram for describing a repair operation performed when a system of FIG. 1 is booted.

FIG. 9 is a conceptual diagram for describing a repair operation performed when the system 100 of FIG. 1 is booted.

Referring to FIG. 9, the BIOS memory 130 may store a BIOS code for booting the system 100. Also, the BIOS memory 130 may store faulty addresses specified by the OS 180 as a faulty row address FRA, a faulty column address FCA, and/or a faulty block address FBA. The faulty row address FRA, the faulty column address FCA, and/or the faulty block address FBA may be stored in a non-volatile memory unit 930. The non-volatile memory unit 930 is a part of a non-volatile memory device constituting the BIOS memory 130.

The system 100 may execute boot operations that execute a part of the BIOS code of the BIOS memory 130 by the processor 110 as the system 100 is powered on. Memory training for the memory 120 may be included in boot operations for executing the BIOS code by the processor 110. The memory training may be performed for the memory controller 112 to determine the optimal parameters for core parameters and/or peripheral circuit parameters of the memory 120. Hereinafter, for convenience of explanation, the memory 120 will be collectively referred to as a dynamic random access memory (DRAM) 120. The DRAM 120 may be any one of a synchronous DRAM (SDRAM), a double data rate SDRAM (DDR SDRAM), a low power double data rate SDRAM (LPDDR SDRAM), a graphics double data rate SDRAM (GDDR SDRAM), a DDR2 SDRAM, a DDR3. SDRAM, a DDR4 SDRAM, DDR5 SDRAM, a wide I/O DRAM, a high bandwidth memory (HBM), and a hybrid memory cube (HMC).

When the system 100 is booted, the memory controller 112 may initialize the DRAM 120 according to an algorithm set in a register control word (RCW) and perform memory training for the DRAM 120. The memory training may be performed by using a memory PHY provided for signals, frequencies, timings, drivings, detailed operation parameters, and functionality needed for an efficient communication between the memory controller 112 and the DRAM 120. The memory controller 112 may provide the faulty row address FRA, the faulty column address FCA, and/or the faulty block address FRA stored in the non-volatile memory unit 930 of the BIOS memory 130 to the DRAM 120 after the memory training of the DRAM 120.

The DRAM 120 may repair faulty cells showing fault characteristics in a memory cell array. The memory cell array may include a plurality of word lines, a plurality of bit lines, and a plurality of memory cells formed at points where the word lines and the bit lines intersect each other. The DRAM 120 may include a repair control circuit 920 configured to repair faulty cells with redundancy cells. The repair control circuit 920 may repair faulty cells detected through a test after a semiconductor manufacturing process of the DRAM 120. Also, the repair control circuit 920 may perform a post package repair (PPR) that repairs faulty cells occurring during continuous use of the DRAM 120 with redundancy cells.

The repair control circuit 920 may perform PPR to replace the faulty row address FRA, the faulty column address FCA, and/or the faulty block address FBA with a redundancy row address RRA, a redundancy column address RCA, and/or a redundancy block address RBA, respectively. The repair control circuit 920 may store information about destination addresses D_ADDR (i.e., the redundancy row address RRA, the redundancy column address RCA, and/or the redundancy block address RBA) that replaced source addresses S_ADDR that needed to be repaired (i.e., the faulty row address FRA, the faulty column address FCA, and/or the faulty block address FBA) in an address storage table 921 (i.e., an address storage circuit). In an example embodiment, the address storage table 921 may be included in the repair control circuit 920 or in the memory 120.

The address storage table 921 may include, for example, an anti-fuse array or a content addressable memory (CAM). The anti-fuse is a resistive fuse element having electrical characteristics opposite to those of a fuse element, having a high resistance value in a non-programmed state, and having a low resistance value in a programmed state. The CAM is a special memory structure that simultaneously compares an input address with source addresses S_ADDR stored in respective CAM entries, and an output of the CAM indicates that a source address S_ADDR, if any, is matching a destination address D_ADDR.

The repair control circuit 920 may provide the address storage table 921 to the memory controller 112. In an example embodiment, the memory controller 112 may access the address storage table 921 to update the information stored in the address storage table 921 or read the information from the address storage table 921. The memory controller 112 may store the address storage table 921 information as memory management information 910 for consistent access of the DRAM 120 by at least one processor 110. The address storage table 921 information may be shared by at least one processor 110. When at least one processor 110 performs an operation for memory allocation during execution of the applications 170, the memory allocation operation is performed based on information in the address storage table 921. Therefore, at least one processor 110 may perform functions commonly known as those of a memory manager, that is, managing an address space of the OS 180 in the DRAM 120 and evenly distributing memory regions to other virtual machines VM using the DRAM 120, by using the memory management information 910.

Figure 10:
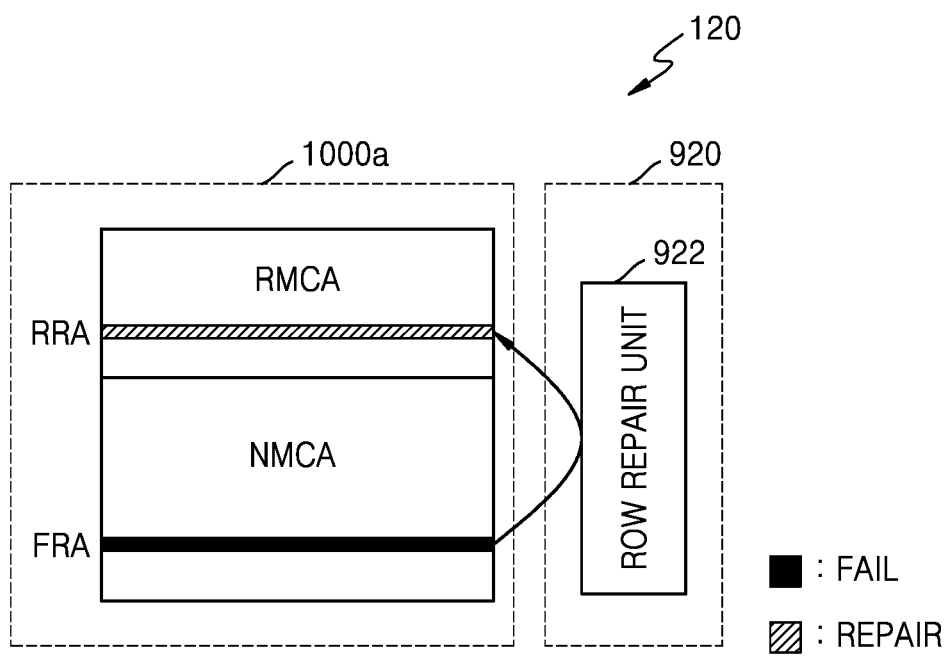
FIGS. 10 to 12 are diagrams for describing a repair operation performed in a memory of FIG. 1.
Figure 11:
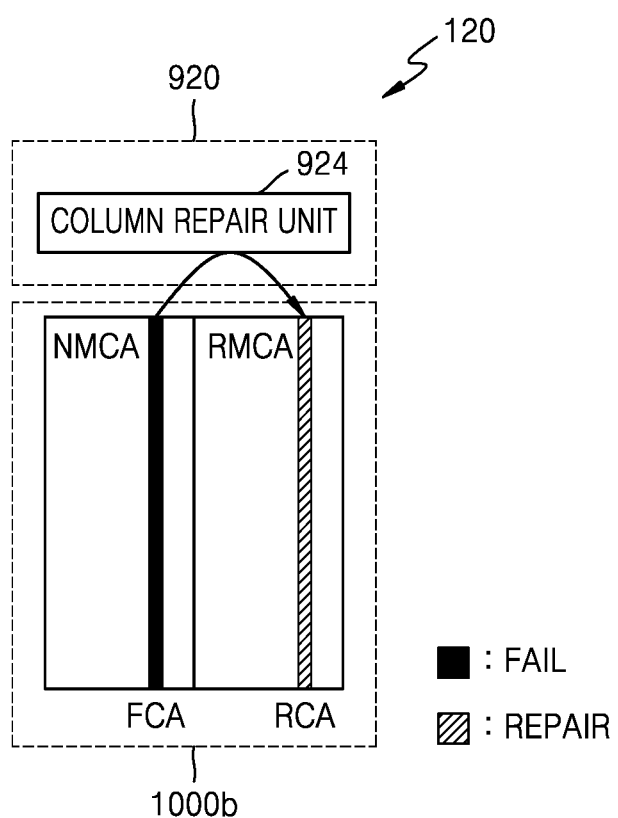
Figure 12:
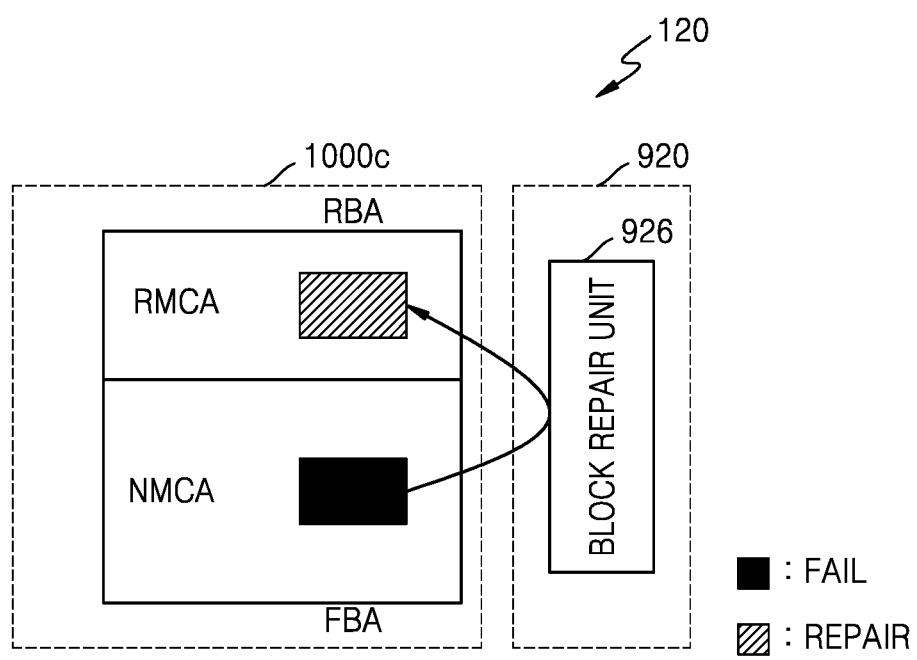

FIGS. 10 to 12 are diagrams for describing a repair operation performed in the memory 120 of FIG. 1.

In FIG. 10, it is assumed that a faulty row address FRA is repaired with a redundancy row address RRA. A memory cell array 1000a may include a normal cell array NMCA and a redundancy cell array RMCA. The normal cell array NMCA may include memory cells connected to word lines and bit lines, and the redundancy cell array RMCA may include memory cells connected to redundancy word lines and redundancy bit lines. The repair control circuit 920 may include a row repairer 922 (i.e., a row repair circuit) that determines a redundancy row address RRA, such that redundancy resources for repairing a faulty row address FRA do not overlap with one another.

The row repairer 922 may perform a repair operation, such that the redundancy row address RRA is selected instead of the faulty row address FRA. When an access row address applied to a memory designates the faulty row address FRA of the normal cell array NMCA, redundancy cells corresponding to the redundancy row address RRA of the redundancy cell array RMCA are selected. The row repairer 922 deactivates a word line corresponding to the faulty row address FRA and activates a redundancy word line corresponding to the redundancy row address RRA instead. Therefore, redundancy cells corresponding to the redundancy row address RRA are selected instead of memory cells corresponding to the faulty row address FRA.

In FIG. 11, it is assumed that a faulty column address FCA is repaired with a redundancy column address RCA. A memory cell array 1000b may include the normal cell array NMCA and the redundancy cell array RMCA. The normal cell array NMCA may include memory cells connected to word lines and bit lines, and the redundancy cell array RMCA may include memory cells connected to the word lines and redundancy bit lines. The repair control circuit 920 may include a column repairer 924 that determines a redundancy column address RCA, such that redundancy resources for repairing a faulty column address FRA do not overlap with one another.

The column repairer 924 may perform a repair operation, such that the redundancy column address RCA is selected instead of the faulty column address FCA. When an access column address applied to a memory designates the faulty column address FCA of the normal cell array NMCA, redundancy cells corresponding to the redundancy column address RCA of the redundancy cell array RMCA are selected. The column repairer 924 prevents a bit line corresponding to the faulty column address FCA from being selected and selects a redundancy bit line corresponding to the redundancy column address RCA instead. Therefore, redundancy cells corresponding to the redundancy column address RCA are selected instead of memory cells corresponding to the faulty column address FCA.

In FIG. 12, it is assumed that a faulty block address FBA is repaired with a redundancy block address RBA. A memory cell array 1000c may include the normal cell array NMCA and the redundancy cell array RMCA. The normal cell array NMCA may include memory cells connected to word lines and bit lines, and the redundancy cell array RMCA may include memory cells connected to redundancy word lines and redundancy bit lines. The repair control circuit 920 may include a block repairer 926 that determines a redundancy block address RBA, such that redundancy resources for repairing a faulty block address FBA do not overlap with one another.

The block repairer 926 may perform a repair operation, such that the redundancy block address RBA is selected instead of the faulty block address FBA. When an access row address and an access column address applied to a memory designate a faulty block address FBA indicating a certain region of the normal cell array NMCA, redundancy cell regions corresponding to the redundancy block address RBA of the redundancy cell array RMCA are selected. The block repairer 926 prevents memory cells in a memory region corresponding to the faulty block address FBA from being selected and selects redundancy cells in a memory region corresponding to the redundancy block address RBA instead.

Figure 13:
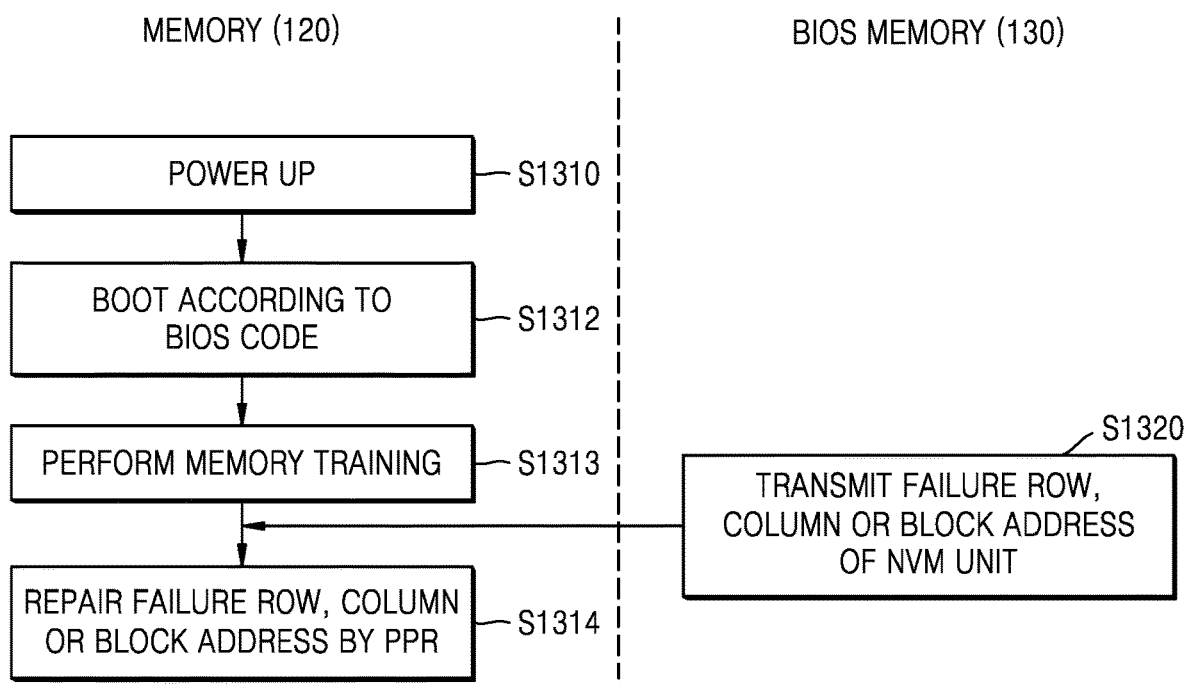
FIG. 13 is a flowchart of a method of booting a system according to an embodiment of the inventive concept.

FIG. 13 is a flowchart of a method of booting the system 100 according to an embodiment of the inventive concept.

Referring to FIGS. 1, 9 and 13, when the system 100 is powered on (operation S1310), the memory 120 may execute booting operations for executing a part of the BIOS code of the BIOS memory 130 through the processor 110. Memory training for the memory 120 may be performed from among the boot operations for executing the BIOS code through the processor 110 (operation S1313). The memory training may be performed for the memory controller 112 to determine the optimal parameters for core parameters and/or peripheral circuit parameters of the memory 120. After the memory training (operation S1313), faulty system physical addresses (e.g., a faulty row address FRA, a faulty column address FCA, and/or a faulty block address FBA) stored in the BIOS memory 130 may be transmitted to the memory 120 (operation S1320).

The memory 120 may perform an operation for repairing faulty system physical addresses (operation S1314). As described above, the memory 120 may repair the faulty row address FRA with a redundancy row address RRA. The memory may repair the faulty column address FCA with a redundancy column address RCA. The memory may repair the faulty block address FBA with a redundancy block address RBA. The memory 120 may repair faulty system physical addresses, thereby using the resources of the memory 120 with the maximum efficiency.

Embodiments of the inventive concept may be implemented in many different types of system. Furthermore, embodiments of the inventive concept may be implemented in code and stored in an article comprising a non-transitory machine-readable storage medium storing instructions that may be used to program system to execute instructions. The non-transitory storage medium may include, but is not limited to, any type of disc including a floppy disc, an optical disc, a solid state drive (SSD), a compact disc read only memory (CD-ROM), a compact disc rewritable (CD-RW), and a magneto-optical disc, a ROM, a random access memory (RAM) like a dynamic random access memory (DRAM) and a static random access memory (SRAM), a semiconductor type device like an erasable and programmable read-only memory (EPROM), a flash memory, and an electrically erasable and programmable read-only memory (EEPROM), a magnetic or optical card, or any other types of media suitable for storing electronic instructions.

While the inventive concept has been particularly shown and described with reference to embodiments thereof, it will be understood that various changes in form and details may be made therein without departing from the spirit and scope of the following claims.

What is claimed is:

1. A method of operating a system running a virtual machine that executes an application and an operating system (OS), the method comprising:
performing, by the OS of the virtual machine, first address translation from a plurality of first virtual addresses processed by the application to a plurality of first physical addresses for accessing a memory;
identifying, by the OS of the virtual machine, a plurality of faulty physical addresses among the plurality of first physical addresses, wherein each of the plurality of faulty physical addresses corresponds to a corresponding first physical address, among the plurality of first physical addresses, associated with a faulty memory cell of the memory;
analyzing, by the OS of the virtual machine, a row address and a column address of each of the plurality of faulty physical addresses and specifying, by the OS, a fault type of the plurality of faulty physical addresses based on the analyzing of the row address and the column address of each of the plurality of faulty physical addresses, wherein the fault type includes a row failure, a column failure or a block failure; and
performing, by the OS of the virtual machine, second address translation from a plurality of second virtual addresses to a plurality of second physical addresses excluding a faulty physical address,
wherein the faulty physical address corresponds to the fault type of the plurality of faulty physical addresses, and includes a faulty row address of the row failure, a faulty column address of the column failure, or a faulty block address of the block failure.

2. The method of claim 1,
wherein the specifying of the fault type of the plurality of faulty physical addresses is performed without rebooting the system.

3. The method of claim 1, further comprising:
determining, by the OS, whether the number of the plurality of faulty physical addresses is greater than a reference value,
wherein the analyzing of the row address and the column address of each of the plurality of faulty physical addresses and the specifying of the fault type of the plurality of faulty physical addresses are performed in response to the determining that the number of the plurality of faulty physical addresses is greater than the reference value.

4. The method of claim 1, further comprising:
storing, by the OS, the faulty physical address in a BIOS memory of the system.

5. The method of claim 4, further comprising:
rebooting the system after the storing of the faulty physical address, wherein the rebooting of the system includes:
reading the faulty physical address from the BIOS memory and providing the faulty physical address to the memory; and
performing a repair operation on the faulty physical address of the memory.

6. The method of claim 5,
wherein the performing of the repair operation includes replacing the faulty row address of the faulty address with a redundancy row address.

7. The method of claim 5,
wherein the performing of the repair operation includes replacing the faulty column address of the faulty physical address with a redundancy column address.

8. The method of claim 5,
wherein the performing of the repair operation includes replacing the faulty block address of the faulty physical address with a redundancy block address.

9. A non-transitory computer-readable recording medium storing computer-executable instructions for performing a method of operating a system running a virtual machine that executes an application and an operating system (OS), the method comprising:
executing the application using a processor and a memory of the system;
performing, by the OS of the virtual machine, first address translation from a plurality of first virtual addresses allocated to the application to a plurality of first physical addresses for accessing the memory;
identifying, by the OS of the virtual machine, during a time when the application is executed, a plurality of faulty physical addresses among the plurality of first physical addresses translated from the plurality of first virtual addresses;
specifying, by the OS of the virtual machine, a fault type of the plurality of faulty physical addresses, wherein the fault type includes a row failure, a column failure, or a block failure; and
performing, by the OS of the virtual machine, second address translation from a plurality of second virtual addresses to a plurality of second physical addresses excluding a faulty physical address,
wherein the faulty physical address corresponds to the fault type of the plurality of faulty physical addresses, and includes a faulty row address of the row failure, a faulty column address of the column failure or a faulty block address of the block failure.

10. The non-transitory computer-readable recording medium of claim 9,
wherein the method further comprises determining whether the number of the plurality of faulty physical addresses exceeds a reference value, and
wherein the specifying of the fault type of the plurality of faulty physical addresses is performed when the number of the plurality of faulty physical addresses is greater than the reference value.

11. The non-transitory computer-readable recording medium of claim 9,
wherein the method further comprises:
storing the faulty physical address in a BIOS memory of the system.

12. The non-transitory computer-readable recording medium of claim 11,
wherein the method further comprise:
rebooting the system after the storing of the faulty physical address,
wherein the rebooting of the system includes:
reading the faulty physical address from the BIOS memory and providing the faulty physical address to the memory.

13. The non-transitory computer-readable recording medium of claim 12,
wherein the rebooting of the system further comprises:
performing a repair operation on the faulty physical address of the memory.

14. The non-transitory computer-readable recording medium of claim 13,
wherein the performing of the repair operation comprises:
performing one of a redundancy row repair, a redundancy column repair, and a redundancy block repair in the memory based on the faulty physical address.

15. A system operating in a virtual machine environment, the system comprising: a memory; and a processor operatively coupled to the memory, wherein the processer, in the system operation in the virtual machine environment, is configured to: execute an application in cooperation with the memory; perform first address translation from a plurality of first virtual addresses processed by the application to a plurality of first physical addresses for accessing the memory; identify a plurality of faulty physical addresses among the plurality of first physical addresses, wherein each of the plurality of faulty physical addresses corresponds to a corresponding first physical address, among the plurality of first physical addresses, associated with a faulty memory cell of the memory; specify a fault type of the plurality of faulty physical addresses of the memory, wherein the fault type includes a row failure, a column failure, or a block failure; and perform second address translation from a plurality of second virtual addresses to a plurality of second physical addresses excluding a faulty physical address to prevent the faulty physical address from being used for the second address translation, wherein the faulty physical address corresponds to the fault type of the plurality of faulty physical addresses, and includes a faulty row address of the row failure, a faulty column address of the column failure or a faulty block address of the block failure, and wherein the processor is further configured to, without causing the system to be rebooted, specify the fault type, store the faulty address, and perform the second address translation.

16. The system of claim 15,
wherein the processor is configured further to:
determine whether the number of the plurality of faulty physical addresses is greater than a reference value; and
specify, in response to determining that the number of the plurality of faulty physical addresses is greater than the reference value, the faulty type of the plurality of faulty physical addresses of the memory.

17. The system of claim 15, further comprising:
a BIOS memory operatively coupled to the processor,
wherein the processor is further configured to store the faulty physical address in the BIOS memory.

18. The system of claim 17,
wherein the processor is configured to, during a time when the system is being rebooted, read the faulty physical address stored in the BIOS memory and provide the faulty physical address to the memory.

19. The system of claim 18,
wherein the processor is configured to perform a repair operation on the faulty physical address of the memory during a time when the system is being rebooted.

20. The system of claim 19,
wherein the processor is configured to perform one of a redundancy row repair, a redundancy column repair, and a redundancy block repair in the memory based on the faulty physical address.

* * * * *